(12) United States Patent
Sugiura et al.

(10) Patent No.: US 11,918,986 B2
(45) Date of Patent: Mar. 5, 2024

(54) EXHAUST GAS PURIFICATION DEVICE

(71) Applicants: Koji Sugiura, Toyota (JP); Takeshi Hirabayashi, Toyota (JP); Akemi Satou, Toyota (JP); Keisuke Murawaki, Kakegawa (JP); Takaya Ota, Toyota (JP); Masatoshi Ikebe, Kakegawa (JP); Kohei Takasaki, Kakegawa (JP); Takeshi Morishima, Kakegawa (JP)

(72) Inventors: Koji Sugiura, Toyota (JP); Takeshi Hirabayashi, Toyota (JP); Akemi Satou, Toyota (JP); Keisuke Murawaki, Kakegawa (JP); Takaya Ota, Toyota (JP); Masatoshi Ikebe, Kakegawa (JP); Kohei Takasaki, Kakegawa (JP); Takeshi Morishima, Kakegawa (JP)

(73) Assignees: TOYOTA JIDOSHA KABUSHIKI KAISHA, Toyota (JP); CATALER CORPORATION, Kakegawa (JP)

(*) Notice: Subject to any disclaimer, the term of this patent is extended or adjusted under 35 U.S.C. 154(b) by 0 days.

(21) Appl. No.: 17/752,495

(22) Filed: May 24, 2022

(65) Prior Publication Data
US 2022/0387983 A1    Dec. 8, 2022

(30) Foreign Application Priority Data

Jun. 4, 2021    (JP) .................................. 2021-094006

(51) Int. Cl.
*B01J 35/00*    (2006.01)
*B01D 53/94*    (2006.01)
(Continued)

(52) U.S. Cl.
CPC ...... *B01J 35/0006* (2013.01); *B01D 53/9472* (2013.01); *B01J 21/04* (2013.01);
(Continued)

(58) Field of Classification Search
CPC ...... B01J 35/0006; B01J 21/04; B01J 21/066; B01J 23/464; B01J 35/04; B01D 53/9472;
(Continued)

(56) References Cited

U.S. PATENT DOCUMENTS 10,159,934 B2 * 12/2018 Kitamura ............. B01J 37/0248
10,159,935 B2 * 12/2018 Onoe ...................... B01J 35/04
(Continued)

FOREIGN PATENT DOCUMENTS

| JP | 2018-051442 A | 4/2018 |
| JP | 6733073 B2 | 7/2020 |
| JP | 2021-154184 A | 10/2021 |

*Primary Examiner* — Lessanework Seifu
(74) *Attorney, Agent, or Firm* — Oliff PLC

(57) ABSTRACT

There is provided an exhaust gas purification device that shows a high HC removal performance under a condition in which a rich air-fuel mixture is introduced. The exhaust gas purification device includes a substrate, a first catalyst layer, and a second catalyst layer. The substrate includes an upstream end and a downstream end. The first catalyst layer is disposed on a surface of the partition wall in an upstream region including the upstream end of the substrate. The second catalyst layer is disposed inside the partition wall in a downstream region including the downstream end of the substrate. The first catalyst layer contains a first metal catalyst and alumina-zirconia composite oxide. The second catalyst layer contains a second metal catalyst.

11 Claims, 5 Drawing Sheets

(51) Int. Cl.
   *B01J 21/04* (2006.01)
   *B01J 21/06* (2006.01)
   *B01J 23/10* (2006.01)
   *B01J 23/42* (2006.01)
   *B01J 23/46* (2006.01)
   *B01J 35/04* (2006.01)
   *F01N 3/28* (2006.01)

(52) U.S. Cl.
   CPC ............ *B01J 21/066* (2013.01); *B01J 23/10* (2013.01); *B01J 23/42* (2013.01); *B01J 23/464* (2013.01); *B01J 35/04* (2013.01); *F01N 3/2803* (2013.01); *F01N 3/2842* (2013.01); *B01D 2255/1021* (2013.01); *B01D 2255/1025* (2013.01); *B01D 2255/2065* (2013.01); *B01D 2255/9035* (2013.01); *B01D 2255/9155* (2013.01); *F01N 2370/02* (2013.01)

(58) Field of Classification Search
   CPC .... B01D 2255/1021; B01D 2255/1025; B01D 2255/2065; B01D 2255/9155; F01N 3/035

USPC ........................................ 422/171, 177, 180
   See application file for complete search history.

(56) References Cited

U.S. PATENT DOCUMENTS

| | | | |
|---|---|---|---|
| 10,344,655 B2* | 7/2019 | Onoe | F01N 3/28 |
| 10,814,311 B2* | 10/2020 | Hoshino | F01N 3/24 |
| 10,926,221 B2* | 2/2021 | Chen | B01D 53/944 |
| 2006/0100101 A1* | 5/2006 | Tsuji | F01N 3/035 502/439 |
| 2016/0279573 A1* | 9/2016 | Hatanaka | B01J 23/58 |
| 2017/0304773 A1* | 10/2017 | Onoe | B01J 37/0244 |
| 2017/0306823 A1* | 10/2017 | Onoe | B01J 37/0236 |
| 2018/0028972 A1* | 2/2018 | Kitamura | B01J 37/0248 |
| 2018/0045097 A1* | 2/2018 | Tang | F01N 3/208 |
| 2018/0111088 A1* | 4/2018 | Li | B01J 29/763 |
| 2019/0193057 A1* | 6/2019 | Hoshino | B01J 37/0236 |
| 2019/0301327 A1* | 10/2019 | Yoshioka | F01N 3/035 |
| 2021/0001315 A1 | 1/2021 | Kurihara et al. | |

* cited by examiner

EXHAUST GAS PURIFICATION DEVICE

CROSS REFERENCE TO RELATED APPLICATIONS

The present application claims priority from Japanese patent application JP 2021-094006 filed on Jun. 4, 2021, the entire content of which is hereby incorporated by reference into this application.

BACKGROUND

Technical Field

The present disclosure relates to an exhaust gas purification device.

Background Art

An exhaust gas emitted from an internal combustion engine used in a vehicle, such as an automobile, contains a Particulate Matter (PM), which mainly contains carbon, and an ash consisting of an incombustible component, and they have been known as a cause of air pollution. The exhaust gas also contains harmful components, such as carbon monoxide (CO), hydrocarbon (HC), and nitrogen oxide (NOx). Regulations for emission amounts of them have been tightened every year.

To trap the Particulate Matter and the ash and remove them from the exhaust gas, a particulate filter, such as a diesel particulate filter for diesel engine (DPF) and a gasoline particulate filter for gasoline engine (GPF), is disposed in an exhaust passage of the internal combustion engine. There has been known a particulate filter including a porous substrate and having what is called a wall-flow structure, in which the porous substrate defines many cells alternately closed at inlets and outlets.

Additionally, to remove the harmful components, such as carbon monoxide (CO), hydrocarbon (HC), and nitrogen oxide (NOx), contained in the exhaust gas, a noble metal catalyst has been used.

JP 2018-051442 A discloses an exhaust gas purification device having a wall-flow structure. The exhaust gas purification device in JP 2018-051442 A includes an upstream-side catalyst layer and a downstream-side catalyst layer. Both of the upstream-side catalyst layer and the downstream-side catalyst layer contain noble metal catalysts and Ce-containing oxide showing an oxygen storage/release capacity (OSC). The exhaust gas purification device described in JP 2018-051442 A is used as a start-up converter (S/C) disposed immediately downstream of an internal combustion engine in a flow direction of an exhaust gas. An additional exhaust gas purification device is disposed as an underfloor converter (UF/C) downstream of the S/C.

SUMMARY

A fuel excessive air-fuel mixture (that is, an air-fuel mixture having an air-fuel ratio A/F of less than 14.6, hereinafter appropriately referred to as "rich air-fuel mixture") is introduced into the exhaust gas purification device in some cases. According to extensive examinations by the inventors, when the rich air-fuel mixture is introduced into the exhaust gas purification device of JP 2018-051442 A, insufficient oxygen is released from the Ce-containing oxide, resulting in insufficient removal of the HC in the exhaust gas in some cases.

Therefore, the present disclosure provides an exhaust gas purification device that shows a high HC removal performance under a condition in which a rich air-fuel mixture is introduced into the device (a rich condition).

According to one aspect of the present disclosure, there is provided an exhaust gas purification device comprising:
a substrate including:
an upstream end through which an exhaust gas is introduced into the device;
a downstream end through which the exhaust gas is discharged from the device; and
a porous partition wall defining a plurality of cells extending between the upstream end and the downstream end;
a first catalyst layer; and
a second catalyst layer,
wherein the first catalyst layer is disposed on a surface of the partition wall in an upstream region including the upstream end of the substrate,
wherein the second catalyst layer is disposed inside the partition wall in a downstream region including the downstream end of the substrate,
wherein the first catalyst layer contains a first metal catalyst and alumina-zirconia composite oxide, and
wherein the second catalyst layer contains a second metal catalyst.

The exhaust gas purification device of the present disclosure shows a high HC the removal performance under a rich condition.

DETAILED DESCRIPTION

Figure 1:
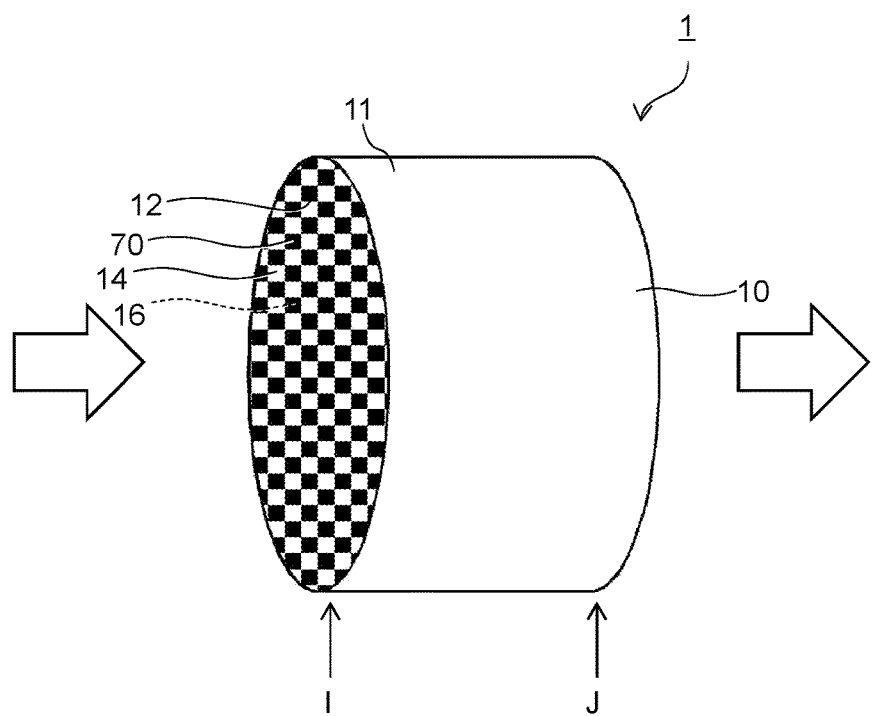
FIG. 1 is a perspective view schematically illustrating an exhaust gas purification device according to an embodiment.

An exhaust gas purification device 1 having a wall-flow structure illustrated in FIGS. 1 and 2 will be described. The exhaust gas purification device 1 includes a substrate 10, a first catalyst layer 30, and a second catalyst layer 50.

(1) Substrate 10

The substrate 10 includes a cylindrical-shaped frame 11 and a partition wall 12 that partitions an inner space of the frame 11 in a honeycomb shape. The frame 11 and the partition wall 12 may be integrally formed. While the frame 11 of FIG. 1 has the cylindrical shape, the shape is not limited to this, and any shapes, such as an elliptical cylindrical shape and a polygonal cylindrical shape, may be applicable. The partition wall 12 extends between a first end (a first end surface) I and a second end (a second end surface) J of the substrate 10, and defines a plurality of cells extending between the first end I and the second end J. The plurality of cells include first cells 14 and second cells 16. The first cells 14 are open at the first end I, and closed (sealed) at the second end J by sealing portions 70. The second cells 16 are closed at the first end I by the sealing portions 70, and open at the second end J. The first cells 14 and the second cells 16 are disposed adjacent to one another with the partition wall 12 interposed between the first cells 14 and the second cells 16. While the first cells 14 and the second cells 16 may have square-shaped cross-sectional shapes taken along surfaces perpendicular to their extending directions, the respective shapes are not limited to them, and may be any shapes, such as quadrilateral shapes including a parallelogram shape, a rectangular shape, and a trapezoidal shape; a triangular shape; any other polygonal shapes (e.g., a hexagonal shape and an octagonal shape); and a circular shape.

The partition wall 12 is formed of a porous material through which an exhaust gas is passable. The partition wall 12 may be formed of, for example, a ceramic, such as cordierite, aluminum titanate, silicon carbide (SiC), or mullite, or an alloy (for example, stainless steel). The partition wall 12 made of the porous material includes pores through which the exhaust gas can flow. While the material of the frame 11 is not specifically limited, the frame 11 may be formed of, for example, a material similar to that of the partition wall 12.

White arrows in FIG. 1 indicate a direction of the exhaust gas introduced into the exhaust gas purification device 1 and discharged from the exhaust gas purification device 1. The exhaust gas that has passed through the first end I into the exhaust gas purification device 1 is discharged from the exhaust gas purification device 1 through the second end J. Therefore, hereinafter, the first end I is also referred to as an upstream end I, and the second end J is also referred to as a downstream end J as appropriate. As indicated by dashed arrows in FIG. 2, the exhaust gas flows through the upstream end I into the first cells 14, passes through the porous partition wall 12 dividing the first cells 14 from the adjacent second cells 16 to flow into the second cells 16, and is discharged from the second cells 16 through the downstream end J. Therefore, the first cell 14 is also referred to as the inlet cell 14, and the second cell 16 is also referred to as the outlet cell 16.

(2) First Catalyst Layer 30

The first catalyst layer 30 is disposed on a surface 12a of the partition wall 12 on the inlet cell 14 side (that is, a surface facing the inlet cell 14, which is hereinafter referred to as a "first surface 12a" as appropriate) in a region (herein referred to an "upstream region") X from the upstream end I of the substrate 10 to a first position K, which is distant from the upstream end I by a first distance Dx along the extending direction of the inlet cell 14 and the outlet cell 16 (that is, an extending direction of the partition wall 12 and hereinafter referred to as an "extending direction" as appropriate). The upstream region X is a region having the length Dx in the extending direction and including the upstream end I as one end. The length Dx of the upstream region X in the extending direction may be set as appropriate so as to obtain a desired exhaust gas purification performance, and may be, for example, from 10% to 90% and especially from 10% to 50% of the distance D from the upstream end I to the downstream end J (that is, the length D of the substrate 10 in the extending direction).

In the upstream region X, the partition wall 12 on which the first catalyst layer 30 is disposed may be impermeable to gas. The first catalyst layer 30 may close the pores in the partition wall 12 such that the partition wall 12 becomes impermeable to gas in the upstream region X. Note that "impermeable to gas" herein means substantially impossible for a gas to pass through.

The first catalyst layer 30 contains a first metal catalyst. The first metal catalyst functions as a catalyst to oxidize HC. For example, the first metal catalyst may be at least one selected from the group consisting of platinum (Pt), palladium (Pd), and rhodium (Rh), at least one selected from the group consisting of Pt and Pd, or especially Pt. The first catalyst layer 30 may further contain other metals such as a noble metal, e.g., ruthenium (Ru), osmium (Os), iridium (Ir), silver (Ag), and gold (Au), an alkali metal, an alkaline earth metal, and a transition metal as long as the function of the first metal catalyst is not impaired.

The first catalyst layer 30 contains alumina-zirconia composite oxide (AZ composite oxide). The "composite oxide" herein means a material including oxides of two or more elements mixed with one another with nanometer-scale uniformity. Physical mixing of alumina ($Al_2O_3$) powder and zirconia ($ZrO_2$) powder cannot provide a material including alumina and zirconia mixed with nanometer-scale uniformity. Therefore, through analysis by SEM-EDX, EPMA, and the like, the AZ composite oxide can be clearly distinguished from the physical mixture of alumina and zirconia. The AZ composite oxide may be a solid solution of alumina and zirconia.

The first catalyst layer 30 may optionally contain first cerium-containing oxide. The first cerium-containing oxide may be ceria ($CeO_2$), composite oxide of ceria and another oxide, or a mixture of them, and may be ceria-zirconia composite oxide (CZ composite oxide) in some embodiments. The first cerium-containing oxide functions as an Oxygen Storage Capacity (OSC) material that occludes oxygen in the atmosphere under oxygen excess atmosphere and releases the oxygen under oxygen deficient atmosphere. Therefore, the first cerium-containing oxide allows reducing a variation of the exhaust gas purification percentage in association with a variation of oxygen content of the exhaust gas introduced into the exhaust gas purification device 1.

A cerium content of the first catalyst layer 30 per unit volume of the substrate 10 in the upstream region X may be smaller than a cerium content of the second catalyst layer 50 described later per unit volume of the substrate 10 in a downstream region Y. The cerium content of the first catalyst layer 30 per unit volume of the substrate 10 in the upstream region X may be less than one time, less than or equal to 0.77 times, less than or equal to 0.75 times, less than or equal to 0.48 times, or less than or equal to 0.45 times of the cerium content of the second catalyst layer 50 per unit volume of the substrate 10 in the downstream region Y. The cerium content of the first catalyst layer 30 per unit volume of the substrate 10 in the upstream region X may be substantially 0 g/L. While the cerium-containing oxide functions as the OSC material as described above, the cerium-containing oxide is considered to reduce a catalytic activity of the first metal catalyst. Controlling the cerium content of the first catalyst layer 30 within the ranges described above allows mitigating or suppressing the reduction in catalytic activity of the first metal catalyst.

The first catalyst layer 30 may optionally further contain other metal oxides. Examples of the other metal oxides include alumina, zirconia, silica ($SiO_2$), magnesia (MgO), titania ($TiO_2$), and composite oxide of them. Two or more of them may be used in combination.

The first metal catalyst may be supported on a carrier. The carrier may be the AZ composite oxide, the first cerium-containing oxide, or the other metal oxides described above, and especially may be the AZ composite oxide.

The first catalyst layer 30 can be disposed on the first surface 12a of the partition wall 12 in the upstream region X through the following illustrative procedure. First, a slurry containing the first metal catalyst, the AZ composite oxide, and the first cerium-containing oxide as an optional component is prepared. The first metal catalyst in the slurry may be supported on carrier powder. The slurry may further contain a binder, an additive, and the like. The prepared slurry is applied over the first surface 12a of the partition wall 12 in the upstream region X. For example, the substrate 10 is dipped in the slurry from the upstream end I, and after a predetermined period has passed, the substrate 10 is pulled up from the slurry, thus allowing the first surface 12a of the partition wall 12 to be coated with the slurry. Alternatively, the slurry may be poured through the upstream end I of the substrate 10 into the inlet cell 14, then the upstream end I may be blown with a blower, thereby spreading the slurry toward the downstream end J, thus allowing the first surface 12a of the partition wall 12 to be coated with the slurry. Next, the slurry is dried and sintered at predetermined temperature and for a predetermined period. This forms the first catalyst layer 30 on the first surface 12a of the partition wall 12.

Note that properties of the slurry, such as viscosity and a particle diameter of a solid component, may be adjusted as appropriate such that the first catalyst layer 30 is formed on the first surface 12a of the partition wall 12 in the upstream region X. For example, increasing the particle size of the solid component in the slurry allows forming the first catalyst layer 30 on the first surface 12a of the partition wall 12.

(3) Second Catalyst Layer 50

The second catalyst layer 50 is disposed inside the partition wall 12 in the region (herein referred to as the "downstream region") Y from the downstream end J of the substrate 10 to a second position L, which is distant from the downstream end J by a second distance Dy along the extending direction. The downstream region Y is a region having the length Dy in the extending direction and including the downstream end J as one end. The length Dy of the downstream region Y in the extending direction may be set as appropriate to obtain the desired exhaust gas purification performance, and may be, for example, from 30% to 100% of the distance D from the upstream end I to the downstream end J.

Note that the sum of the length Dx of the upstream region X in the extending direction and the length Dy of the downstream region Y in the extending direction may be equal to or larger than the distance D from the upstream end I to the downstream end J, and may be larger than the distance D from the upstream end I to the downstream end J. This allows at least one of the first catalyst layer 30 or the second catalyst layer 50 to be formed on the partition wall 12 or inside the partition wall 12 anywhere throughout the entire region from the upstream end I to the downstream end J, thereby allowing reliable contact of the exhaust gas introduced into the exhaust gas purification device 1 with the first catalyst layer 30 and the second catalyst layer 50 in this order.

"The second catalyst layer 50 is disposed inside the partition wall 12" herein means that the components constituting the second catalyst layer 50 (namely, the catalyst, the carrier, the binder, the additive, and the like) are mainly present inside the partition wall 12, not the outside of the partition wall 12 (typically, on the surface). Specifically, this means, for example, that 80% or more, 85% or more in some embodiments, 90% or more in some embodiments, 99% or more in some embodiments, or substantially 100% in some embodiments, of the total weight of the components constituting the second catalyst layer 50 is present inside the partition wall 12. Accordingly, the second catalyst layer 50 disposed inside the partition wall 12 is apparently distinct from a penetrated portion of a catalyst layer unintentionally penetrated into the partition wall 12 in an attempt to dispose the catalyst layer on the surface of the partition wall 12.

The components constituting the second catalyst layer 50 may be lie on an inner surface of the partition wall 12 surrounding the pores without obstructing all of the pores inside the partition wall 12. This allows the partition wall 12 on which the second catalyst layer 50 is disposed to be permeable to a gas in the downstream region Y (excluding the overlapping part with the upstream region X).

The second catalyst layer 50 contains a second metal catalyst. The second metal catalyst functions as a catalyst to reduce NOx. For example, the second metal catalyst may be Rh. The second catalyst layer 50 may further contain, for example, other metals such as a noble metal, e.g., palladium (Pd), platinum (Pt), ruthenium (Ru), osmium (Os), iridium (Ir), silver (Ag), and gold (Au), an alkali metal, an alkaline earth metal, and a transition metal as long as the function of the second metal catalyst is not impaired.

The second catalyst layer 50 may optionally contain second cerium-containing oxide. The second cerium-containing oxide may be ceria, composite oxide of ceria and another oxide, or a mixture of them, and may be CZ composite oxide in some embodiments. The second cerium-containing oxide functions as an OSC material that occludes oxygen in the atmosphere under oxygen excess atmosphere and releases the oxygen under oxygen deficient atmosphere. Therefore, the second cerium-containing oxide allows reducing a variation of the exhaust gas purification percentage in association with a variation of oxygen content of the exhaust gas introduced into the exhaust gas purification device 1.

The second catalyst layer 50 may optionally further contain other metal oxides. Examples of the other metal oxides include alumina, zirconia, silica, magnesia, titania, and composite oxide of them. Two or more of them may be used in combination.

The second metal catalyst may be supported on a carrier. The carrier may be the AZ composite oxide, the second cerium-containing oxide, or the other metal oxides as described above, may be the second cerium-containing oxide, and may be the CZ composite oxide.

Note that, "the cerium content of the first catalyst layer 30 per unit volume of the substrate 10 in the upstream region X" herein is a value found by dividing a mass of the cerium contained in the first catalyst layer 30 by a volume inside the frame 11 in the upstream region X, and "the cerium content of the second catalyst layer 50 per unit volume of the substrate 10 in the downstream region Y" is a value found by dividing a mass of the cerium contained in the second catalyst layer 50 by a volume inside the frame 11 in the downstream region Y. The mass of the cerium contained in each of the first catalyst layer 30 and the second catalyst layer 50 can be determined by, for example, pulverizing the partition wall 12 on which the first catalyst layer 30 or the second catalyst layer 50 is disposed and analyzing it by Inductively Coupled Plasma Atomic Emission Spectroscopy (ICP-AES).

The second catalyst layer 50 can be disposed inside the partition wall 12 in the downstream region Y through the following illustrative procedure. First, a slurry containing the second metal catalyst and the second cerium-containing oxide is prepared. The second metal catalyst in the slurry may be further supported on carrier powder. The slurry may further contain the binder and the additive, and the like. The prepared slurry is infiltrated into the partition wall 12 in the downstream region Y. For example, the substrate 10 is dipped in the slurry from the downstream end J, and after a predetermined period has passed, the substrate 10 is pulled up from the slurry, thus allowing the slurry to be infiltrated into the partition wall 12. Next, the slurry is dried and sintered at predetermined temperature and for a predetermined period. This forms the second catalyst layer 50 inside the partition wall 12.

Note that properties of the slurry, such as viscosity and a particle diameter of a solid component, may be adjusted as appropriate such that the second catalyst layer 50 is formed inside the partition wall 12 in the downstream region Y. For example, decreasing the particle size of the solid component in the slurry allows forming the second catalyst layer 50 inside the partition wall 12 without obstructing the pores in the partition wall 12.

The exhaust gas purification performance of the exhaust gas purification device 1 is described below.

Figure 2:
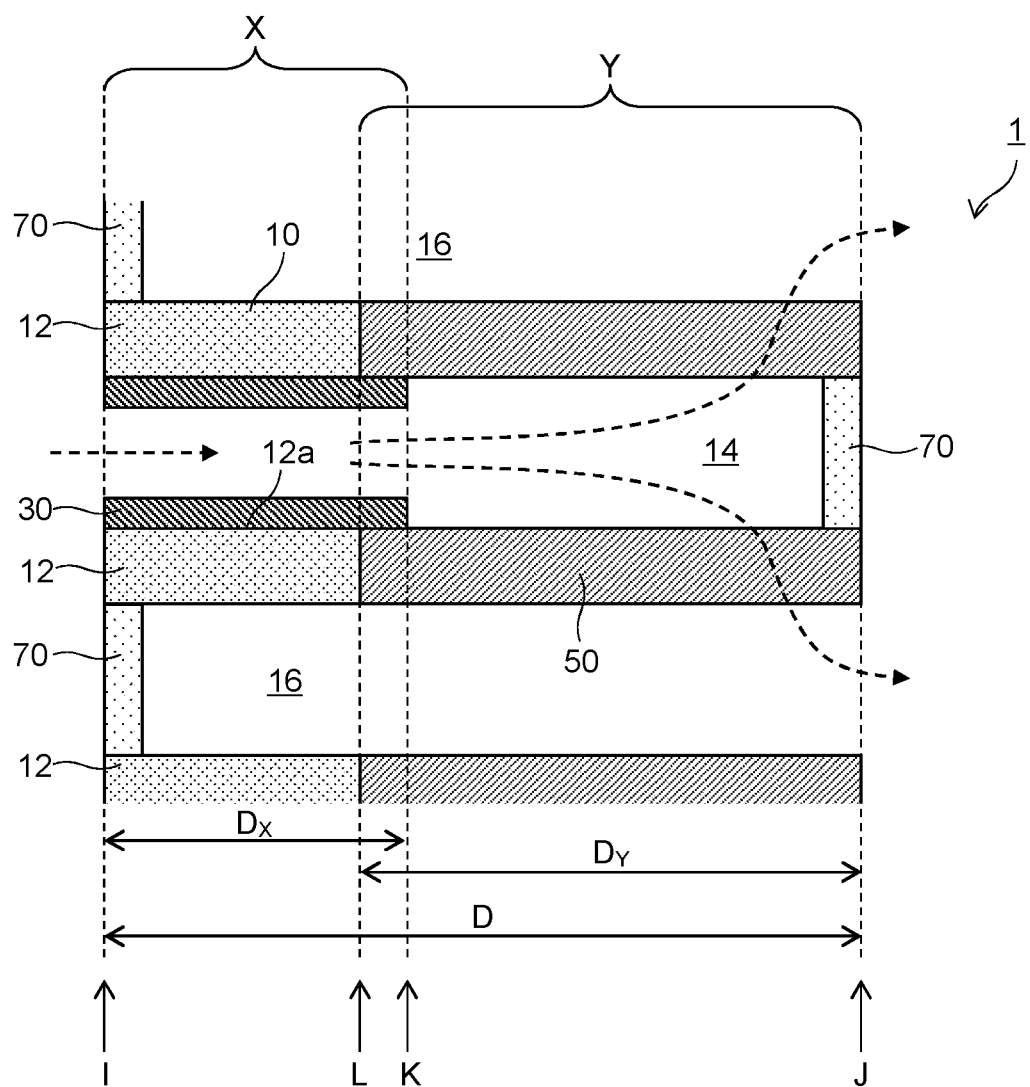
FIG. 2 is an enlarged end view of the main part of the exhaust gas purification device according to the embodiment taken along a surface parallel to an extending direction of cells, and schematically illustrating a configuration at a proximity of a partition wall.

As indicated by the dashed arrows in FIG. 2, the exhaust gas introduced into the exhaust gas purification device 1 passes through the upstream end I of the substrate 10 into the inlet cell 14. In the upstream region X, the exhaust gas moves inside the inlet cell 14 toward the downstream region Y along the first catalyst layer 30, during which the exhaust gas is in contact with the first catalyst layer 30 thereby oxidizing the HC in the exhaust gas and removing it from the exhaust gas. Next, in the downstream region Y, the exhaust gas passes through the inside of the partition wall 12 into the outlet cell 16, during which the PM and the ash in the exhaust gas are trapped on the surface of the partition wall 12 and inside the pores. Additionally, the exhaust gas is brought into contact with the second catalyst layer 50 inside the partition wall 12, thereby reducing the NOx in the exhaust gas and removing it from the exhaust gas. The exhaust gas having flowed into the outlet cell 16 in the downstream region Y moves inside the outlet cell 16 toward the downstream end J along the partition wall 12, and passes through the downstream end J to be discharged to outside the exhaust gas purification device 1.

Thus, the exhaust gas introduced into the exhaust gas purification device 1 is reliably brought into contact with the first catalyst layer 30 and the second catalyst layer 50 for a predetermined period and in a predetermined order. When the partition wall 12 on which the first catalyst layer 30 is disposed is substantially impermeable to gas in the upstream region X and the partition wall 12 in which the second catalyst layer 50 is disposed is permeable to gas in the downstream region Y (excluding the overlapping part with the upstream region X), the exhaust gas introduced into the exhaust gas purification device 1 is especially reliably brought into contact with the first catalyst layer 30 and the second catalyst layer 50 for the predetermined period and in the predetermined order. This improves the efficiency of the exhaust gas purification.

As will be described in Example described later, the exhaust gas purification device 1 shows the high HC removal performance under the rich condition. Without being bound by any theory, the inventors consider the reason as follows.

The HC in the air-fuel mixture introduced into the exhaust gas purification device 1 is usually removed through a reaction with the oxygen in the air-fuel mixture or the oxygen released from the OSC material to form $H_2O$ and $CO_2$. However, when the rich air-fuel mixture is continuously introduced into the exhaust gas purification device 1, the amount oxygen gets insufficient for the reaction with the HC in some cases. Here, the AZ composite oxide contained in the first catalyst layer 30 has a high effect of promoting steam reforming of HC as will be described in Example described later. Therefore, even in the shortage of oxygen, the HC in the air-fuel mixture introduced into the exhaust gas purification device 1 can be removed by reaction with water vapor contained in the air-fuel mixture (namely, steam reforming). Accordingly, the exhaust gas purification device 1 shows the high HC removal performance under rich condition.

Additionally, it is considered that the remaining HC that has not been removed by the first catalyst layer 30 forms a polymer and attaches to the second catalyst layer 50, which causes a deterioration of OSC capability of the OSC material in the second catalyst layer 50. This leads to decrease in the NOx reduction efficiency in the second catalyst layer 50. However, the above-described high HC removal performance of the exhaust gas purification device 1 allows reducing the influence of the remaining HC on the NOx reduction efficiency.

The exhaust gas purification device 1 is applicable to various kinds of vehicles including an internal combustion engine. The exhaust gas purification device 1 can be used as a start-up converter (S/C) disposed immediately downstream of the internal combustion engine in a flow direction of exhaust gas or an underfloor converter (UF/C) disposed downstream of the S/C in the flow direction of exhaust gas. Especially, it is highly advantageous to use the exhaust gas purification device 1 as the UF/C because the UF/C often lacks sufficient oxygen for reaction with the HC.

While the embodiments of the present disclosure have been described in detail, the present disclosure is not limited to the embodiments, and various changes are possible within the scope of not departing from the spirit of the present disclosure described in the claims. For example, instead of the wall-flow structure illustrated in FIGS. 1 and 2, the exhaust gas purification device may have a flow-through structure. The exhaust gas purification device having the flow-through structure is different from the exhaust gas purification device having the wall-flow structure in that the device having the flow-through structure does not include sealing portions sealing the plurality of cells and that the plurality of cells are open. When the exhaust gas purification device has the flow-through structure, the first catalyst layer may be disposed on a first surface and the opposed surface of the partition wall.

EXAMPLE

The following will specifically describe the present disclosure with the example, but the present disclosure is not limited to the example.

(1) Manufacture of Exhaust Gas Purification Devices

Example

A substrate having a wall-flow structure made of cordierite was prepared. Dimensions and a structure of the substrate were as follows.

Outer diameter of the substrate: 117 mm
Length of the substrate in an extending direction of a cell: 122 mm Thickness of a partition wall: about 200 μm
Cell density: 300 pieces per square inch Powder of alumina-zirconia composite oxide (AZ composite oxide) (alumina:zirconia=1:2 (weight ratio)) was impregnated with an aqueous solution of Pt nitrate and then was dried to prepare Pt-supporting AZ composite oxide powder. The obtained powder, ceria powder, and ion exchanged water were mixed to prepare a first catalyst slurry.

Powder of ceria-zirconia composite oxide (CZ composite oxide) was impregnated with an aqueous solution of Rh nitrate and then was dried to prepare Rh-supporting CZ composite oxide powder. The obtained powder, alumina powder, and ion exchanged water were mixed to prepare a second catalyst slurry.

The second catalyst slurry was provided to outlet cells through the downstream end of the substrate to be infiltrated into an inside of the partition wall. Next, the second catalyst slurry was dried and sintered. Thus, a second catalyst layer was formed inside the partition wall. The second catalyst layer was formed in a region (a downstream region) from the downstream end of the substrate to a position distant from the downstream end toward the upstream end of the substrate by a distance of 70% of the length of the substrate in an extending direction.

The first catalyst slurry was provided to inlet cells through the upstream end of the substrate, thereby forming a layer of the first catalyst slurry on the surface of the partition wall facing the inlet cell. Next, the first catalyst slurry was dried and sintered. Thus, a first catalyst layer was formed on the surface of the partition wall facing the inlet cell. The first catalyst layer was formed in a region (an upstream region) from the upstream end of the substrate to a position distant from the upstream end toward the downstream end of the substrate by a distance of 50% of the length of the substrate in the extending direction.

Thus, an exhaust gas purification device was manufactured. A ratio ($C_{Fr}/C_{Rr}$) of a cerium content ($C_{Fr}$) of the first catalyst layer per unit volume of the substrate in the upstream region to a cerium content ($C_{Rr}$) of second catalyst layer per unit volume of the substrate in the downstream region was 1/10.

Comparative Example 1

Except that alumina powder was used instead of the AZ composite powder in the preparation of the first catalyst slurry, the exhaust gas purification device was manufactured similarly to Example.

Comparative Example 2

Except that zirconia powder was used instead of the AZ composite powder in the preparation of the first catalyst slurry, the exhaust gas purification device was manufactured similarly to Example.

Comparative Example 3

Except that a physical mixture (alumina:zirconia=10:7 (weight ratio)) of alumina powder and zirconia powder was used instead of the AZ composite powder in the preparation of the first catalyst slurry, the exhaust gas purification device was manufactured similarly to Example.

(2) Evaluation for Purification Performance

Figure 3:
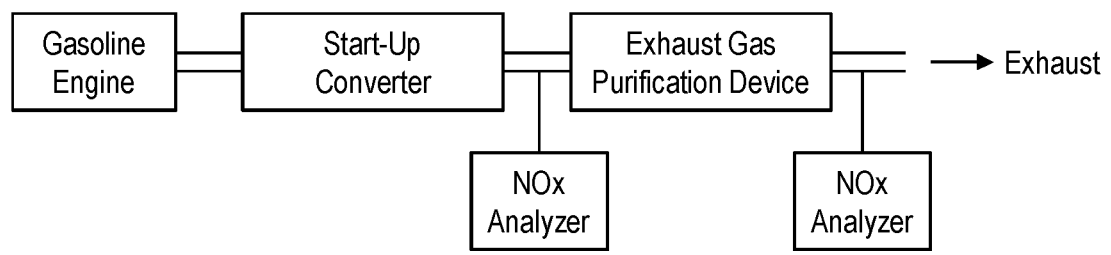
FIG. 3 is a drawing schematically illustrating a configuration for evaluating a purification performance of exhaust gas purification devices of an example and comparative examples.

As illustrated in FIG. 3, the start-up converter (S/C) and each of the exhaust gas purification devices of Example and Comparative Examples 1 to 3 was connected to an exhaust system of 2.0 L of a gasoline engine bench. An air-fuel mixture of rich (air-fuel ratio A/F<14.6), stoichiometric (A/F=14.6), and lean (A/F>14.6) was repeatedly introduced into a gasoline engine for a certain period of time for each, and a bed temperature of the S/C was maintained at 950° C. and a bed temperature of the exhaust gas purification device was maintained at 900° C. for 50 hours. Thus, the S/C and the exhaust gas purification device were aged.

Next, the gasoline engine was actuated in control imitating steady running of a vehicle. Specifically, a rotation speed of the gasoline engine was set to be 2400 rpm, and the air-fuel mixture was introduced into the gasoline engine at a flow rate of 35 g/s. The air-fuel ratio A/F of the air-fuel mixture was first set to be lean (A/F>14.6), and after that was switched to be rich (A/F<14.6), and was held for five minutes. An operation condition of the gasoline engine was controlled such that the bed temperature of the exhaust gas purification device became 550° C.

Figure 4:
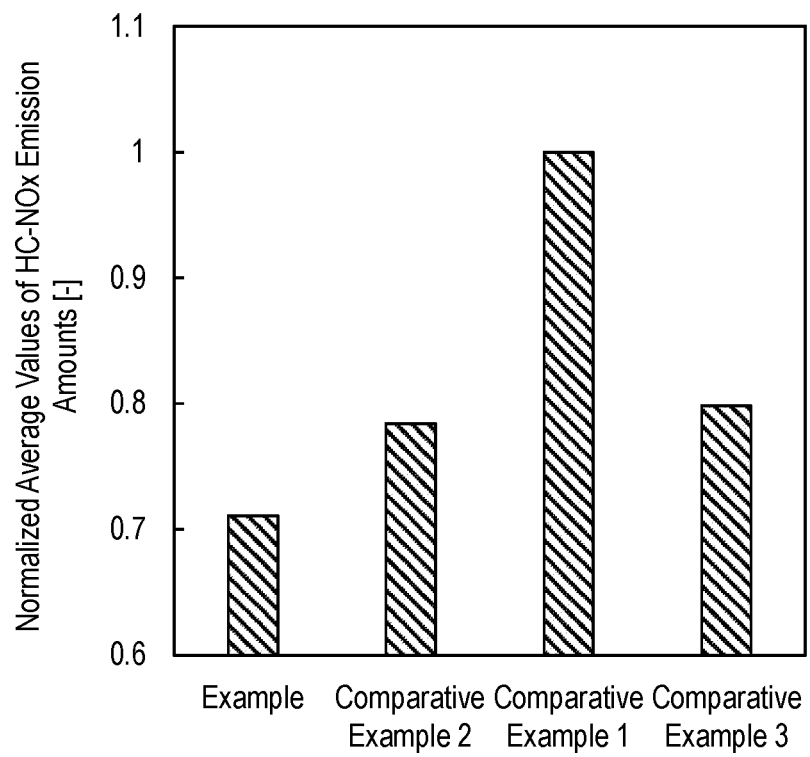
FIG. 4 is a graph illustrating average values (normalized values) of HC-NOx emission amounts from the exhaust gas purification devices of the example and the comparative examples.

Emission amounts of HC and NOx (HC-NOx emission amounts) from the exhaust gas purification device were measured for 100 seconds from the time of the elapse of 200 seconds after starting switching the air-fuel ratio A/F of the air-fuel mixture to obtain the average value of the HC-NOx emission amounts in the measurement period. The values were normalized by dividing the average value of the HC-NOx emission amounts from each of the exhaust gas purification devices of Example and Comparative Examples 1 to 3 by the average value of the HC-NOx emission amounts from the exhaust gas purification device of Comparative Example 1. The graph in FIG. 4 illustrates the normalized average values of HC-NOx emission amounts. It has been shown that, compared with the exhaust gas purification devices of Comparative Examples 1 to 3, the exhaust gas purification device of Example in which the first catalyst layer contained the AZ composite allowed the reduction in the HC-NOx emission amounts.

(3) Reference Experiment (Evaluation for Steam Reforming with First Catalyst Layer)

Alumina powder, zirconia powder, AZ composite oxide (alumina:zirconia=1:2 (weight ratio)) powder, and a physical mixture of alumina powder and zirconia powder (alumina:zirconia=7:3 (weight ratio)) were prepared to manufacture a pellet from each of them. Specifically, first, each of the raw materials were subjected to a wet milling to a median diameter D50 of 8 μm. The milled powder was impregnated with an aqueous solution of Pt nitrate and was dried. The resultant was sintered in the air at 500° C. with an electric furnace, then compression-molded to form the pellet.

Figure 5:
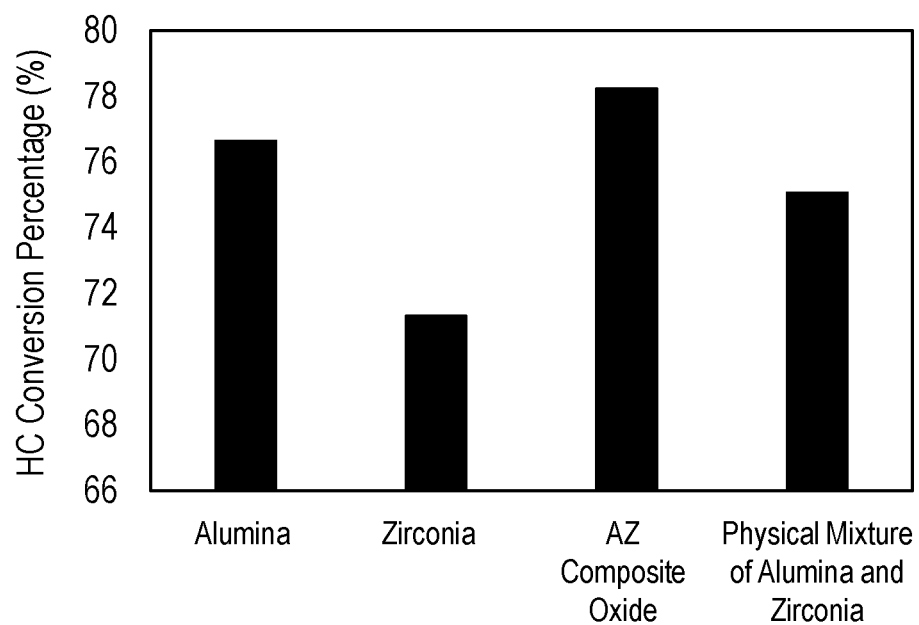
FIG. 5 is a graph illustrating HC conversion percentages with pellets manufactured in reference experiments.

Each pellet was placed in an $N_2$ flow (flow rate: 20 L/minute), and the $N_2$ gas was heated to 600° C. Next, each pellet was exposed to a mixed gas at 600° C. consisting of 2000 ppmC (concentration in terms of carbon) of $C_3H_6$, 10 vol % of $H_2O$, and a balance of $N_2$ and flowing at a flow rate of 20 L/minute. A concentration of $C_3H_6$ in the gas after passing through the pellet was measured for three minutes after starting the exposure of the pellet to the mixed gas containing $C_3H_6$ and $H_2O$ to obtain the HC conversion percentage. FIG. 5 illustrates the results.

Since the mixed gas containing $C_3H_6$ to which each pellet was exposed did not contain $O_2$, $C_3H_6$ in the mixed gas was not removed by reaction with $O_2$ but by reaction with $H_2O$ (namely, steam reforming). As illustrated in FIG. 5, the pellet manufactured from the AZ composite oxide powder showed higher HC conversion percentage than any pellet manufactured from the alumina powder, the zirconia powder, or the physical mixture of them. This exhibited that the AZ composite oxide had higher steam reforming promotion effect than those of the alumina, the zirconia, and the physical mixture of them.

What is claimed is:

1. An exhaust gas purification device comprising:
a substrate including:
an upstream end through which an exhaust gas is introduced into the device;
a downstream end through which the exhaust gas is discharged from the device; and
a porous partition wall defining a plurality of cells extending between the upstream end and the downstream end;
a first catalyst layer; and
a second catalyst layer,
wherein the first catalyst layer is disposed on a surface of the partition wall in an upstream region including the upstream end of the substrate,
wherein the second catalyst layer is disposed inside the partition wall in a downstream region including the downstream end of the substrate,
wherein the first catalyst layer contains an alumina-zirconia composite oxide and a first metal catalyst, wherein the first metal catalyst is at least one selected from the group consisting of Pt and Pd, supported on the alumina-zirconia composite oxide, and wherein the first metal catalyst layer optionally further contains a first cerium-containing oxide,
wherein the second catalyst layer contains a second metal catalyst, wherein the second metal catalyst is Rh, and wherein the second catalyst layer further contains a second cerium-containing oxide, and
wherein the first catalyst layer has a cerium content per unit volume of the substrate in the upstream region smaller than a cerium content of the second catalyst layer per unit volume of the substrate in the downstream region.

2. The exhaust gas purification device according to claim 1,
wherein the second cerium-containing oxide is ceria-zirconia composite oxide.

3. The exhaust gas purification device according to claim 1,
wherein the second metal catalyst is supported on the second cerium-containing oxide.

4. The exhaust gas purification device according to claim 1,
wherein the exhaust gas purification device is disposed downstream of a start-up converter in a flow direction of the exhaust gas.

5. The exhaust gas purification device according to claim 1,
wherein the plurality of cells include:
an inlet cell opening at the upstream end and sealed at the downstream end; and
an outlet cell adjacent to the inlet cell with the partition wall interposed between the inlet cell and the outlet cell, the outlet cell sealed at the upstream end and opening at the downstream end.

6. The exhaust gas purification device according to claim 1,
wherein the alumina-zirconia composite oxide supports only the first metal catalyst.

7. The exhaust gas purification device according to claim 1,
wherein a cerium content of the first catalyst layer per unit volume of the substrate in the upstream region is substantially 0 g/L.

8. An exhaust gas purification device comprising:
a substrate including:
an upstream end through which an exhaust gas is introduced into the device;
a downstream end through which the exhaust gas is discharged from the device; and
a porous partition wall defining a plurality of cells extending between the upstream end and the downstream end;
a first catalyst layer; and
a second catalyst layer,
wherein the first catalyst layer is disposed on a surface of the partition wall in an upstream region including the upstream end of the substrate,
wherein the second catalyst layer is disposed inside the partition wall in a downstream region including the downstream end of the substrate,
wherein the first catalyst layer contains an alumina-zirconia composite oxide and a first metal catalyst supported on the alumina-zirconia composite oxide, wherein the alumina-zirconia composite oxide consists of alumina and zirconia, and
wherein the second catalyst layer contains a second metal catalyst.

9. The exhaust gas purification device according to claim 8,
wherein the first catalyst layer optionally further contains first cerium-containing oxide,
wherein the second catalyst layer further contains second cerium-containing oxide,
wherein the first catalyst layer has a cerium content per unit volume of the substrate in the upstream region smaller than a cerium content of the second catalyst layer per unit volume of the substrate in the downstream region,
wherein the first metal catalyst is at least one selected from the group consisting of Pt and Pd, and
wherein the second metal catalyst is Rh.

10. The exhaust gas purification device according to claim 8,
wherein the first metal catalyst is at least one selected from the group consisting of Pt, Pd, and Rh.

11. The exhaust gas purification device according to claim 8,
wherein the second metal catalyst is Rh.

* * * * *